April 6, 1926.

S. G. MURRAY

WEIGHING MACHINE

Filed Nov. 27, 1923

Inventor
Stanley G. Murray

By
Attorney

Fig. 2.

Inventor
Stanley G. Murray

By  Attorney

April 6, 1926.

S. G. MURRAY

WEIGHING MACHINE

Filed Nov. 27, 1923  6 Sheets-Sheet 3

Inventor
Stanley G. Murray

April 6, 1926.

S. G. MURRAY

1,579,452

WEIGHING MACHINE

Filed Nov. 27, 1923

Inventor
Stanley G. Murray

By

Attorney

April 6, 1926.

S. G. MURRAY

WEIGHING MACHINE

Filed Nov. 27, 1923   6 Sheets-Sheet 6

1,579,452

Inventor
Stanley G. Murray
By
Attorney

Patented Apr. 6, 1926.

1,579,452

UNITED STATES PATENT OFFICE.

STANLEY G. MURRAY, OF PASSAIC, NEW JERSEY.

WEIGHING MACHINE.

Application filed November 27, 1923. Serial No. 677,278.

*To all whom it may concern:*

Be it known that I, STANLEY G. MURRAY, a citizen of the United States, residing at Passaic, in the county of Passaic and State of New Jersey, have invented new and useful Improvements in Weighing Machines, of which the following is a specification.

The present invention relates to scales or weighing machines, and more particularly to those of the automatic type wherein the operations of making up weighed charges and dumping or discharging the same are performed automatically and in succession.

The invention provides a novel and improved scale or weighing machine of this general type which is capable of operating rapidly and substantially without shock or noise in the making up and dumping of the charges and is capable of weighing the charges with uniform accuracy.

An object of the invention is to provide a weigh hopper which is divided into compartments and is mounted to revolve on an axis which is inclined to the vertical, whereby the weight of a load or charge of material made up in the compartment at the upper side of the axis will supply the requisite motive power to rotate the hopper to bring its loaded compartment into discharging position, said axis of rotation, according to the present invention, being adjustable so that it may be varied to suit the flowing qualities or the quantities of the materials to be handled or the speed of operation desired.

Another object of the invention is to so mount the weigh hopper and the means for controlling its rotation that these elements are wholly supported or suspended on the weighing mechanism and to provide novel cut-off means for the hopper feed means, whereby accuracy and uniformity in the weighing operations are insured.

Other objects of the invention are to provide novel constructions and arrangements of the hopper feed and discharge means whereby the operations of supplying material to the hopper and discharging the weighed charges therefrom, are performed efficiently and without the possibility of material passing unweighed through the machine, to provide novel controlling means for holding the hopper from rotation until a charge of material of the predetermined weight has been made up therein and for then releasing the hopper to permit its rotation into a position for the discharge of such charge, whereupon the controlling means acts to hold the hopper in such position, to provide novel means for supplying the material to be weighed to the hopper, to provide novel tripping means for automatically actuating the hopper feed control means to cut-off the feed to the hopper and to release the hopper control means to cause rotation of the hopper to discharge the weighed material therein when a charge of the proper weight has been made up, and to provide other novel features which enable the weighing operations to be tested or checked to insure accuracy, provide for manual control of the operation of the machine, enable adjustment of the weigh hopper to set it in position for most efficient starting and stopping of its rotation, absorb shock incident to the stopping of each rotation of the hopper and to otherwise insure efficiency, speed, certainty and facility in the operation of the machine.

To these and other ends, the invention consists in certain improvements and combinations and arrangements of parts, all as will be hereinafter more fully described, the features of novelty being pointed out particularly in the claims at the end of the specification.

In the accompanying drawings:—

Similar parts are designated by the same reference characters in the several views.

The present invention, in whole or in part, is applicable generally to scales or weighing machines for weighing materials of various kinds, although it may be applied with particular advantage to scales or weighing machines employed for the weighing of liquids, as it avoids splashing of the liquid and presents other advantages, as will hereinafter appear. The preferred embodiment of the invention is shown in the accompanying drawings and will be hereinafter described in detail. It is to be understood, however, that the invention is not restricted to the particular construction shown, as equivalent constructions are contemplated and such will be included within the scope of the claims.

In the present instance, the scale or weighing machine embodies a suitable frame 1 which may be supported in any suitable way, as, for example, by resting on a floor or foundation, this frame preferably serving to support the various elements or mechanisms of the machine. The weigh hopper 2 which, as will be hereinafter described, is suspended or supported by the weighing mechanism, may be of any suitable form, although it is preferably cylindrical or substantially so in form and is mounted on a shaft 3 which extends axially through it. The hopper is divided into preferably two compartments by a partition 4, which latter extends diametrically within the hopper and, in the preferred construction, a sleeve 5 surrounds the shaft and excludes the liquid or other material in the hopper from the shaft. The shaft is fixed within the hopper, its lower end extending through a hub 6 which is fixed to the bottom of the hopper and the shaft is centered and the weight of the hopper is sustained by a suitable foot step bearing 7 which is preferably of the anti-friction type and is mounted in a lower supporting member 8. The upper portion of the shaft is centered and also supported by a bearing 9 which is preferably of the anti-friction type and is fitted in an upper member 10, the hopper being adapted to rotate with or about the shaft 3 as an axis. The hopper-supporting members 8 and 10 are connected at their ends to uprights 11 at opposite sides of the hopper, and these uprights are pivotally suspended from arms 12 at opposite sides of the machine by horizontal pivot pins 13, so that the structure composed of the supports 8 and 10 and uprights 11, and which carries the hopper and its shaft, may swing about the axis 13 to bring the shaft or axis of revolution of the hopper into different inclinations with respect to the vertical. A member 14 is pivotally connected to one end of each of the members 12 and to the lower end of the corresponding upright 11, these members 14 being adjustable in length. Rods having their ends threaded or otherwise adjustably fitted in clevises 15 are suitable for the purpose. By lengthening or shortening the members 14 the structure comprising the supporting members 8 and 10 and uprights 11 will be swung about the axes 13 to cause the angle of inclination of the axis of the hopper relatively to the vertical, to be varied according to requirements, as for example, to suit the rate of flow or the quantity of the particular material to be handled, or the speed of operation of the machine, as may be desired, the angle of inclination of the axis of the hopper to the vertical determining the speed at which the hopper rotates on its axis under the influence of the weight of a charge of material contained in the compartment of the hopper which is at the upper side of its inclined axis, the weight of such material furnishing motive power for rotating the hopper to carry a filled compartment from the filling position at the left-hand side of Figure 2 to the discharging position at the right-hand side of said figure.

Figure 1:
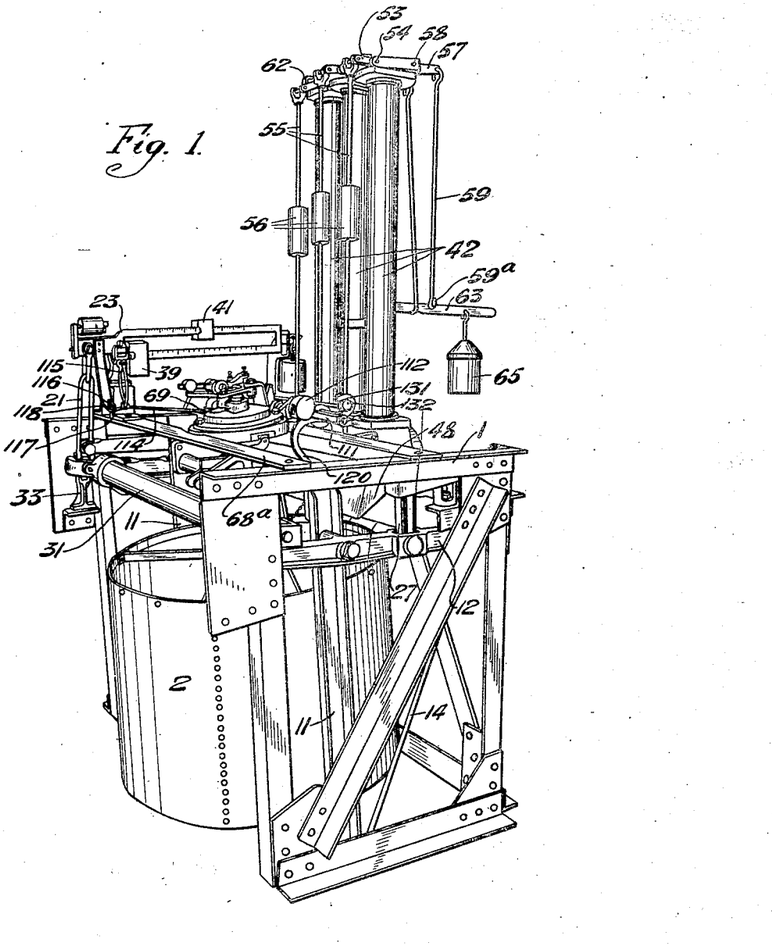
Figure 1 is a perspective view of an automatic scale or weighing machine constructed in accordance with the preferred embodiment of the invention.
Figure 2:
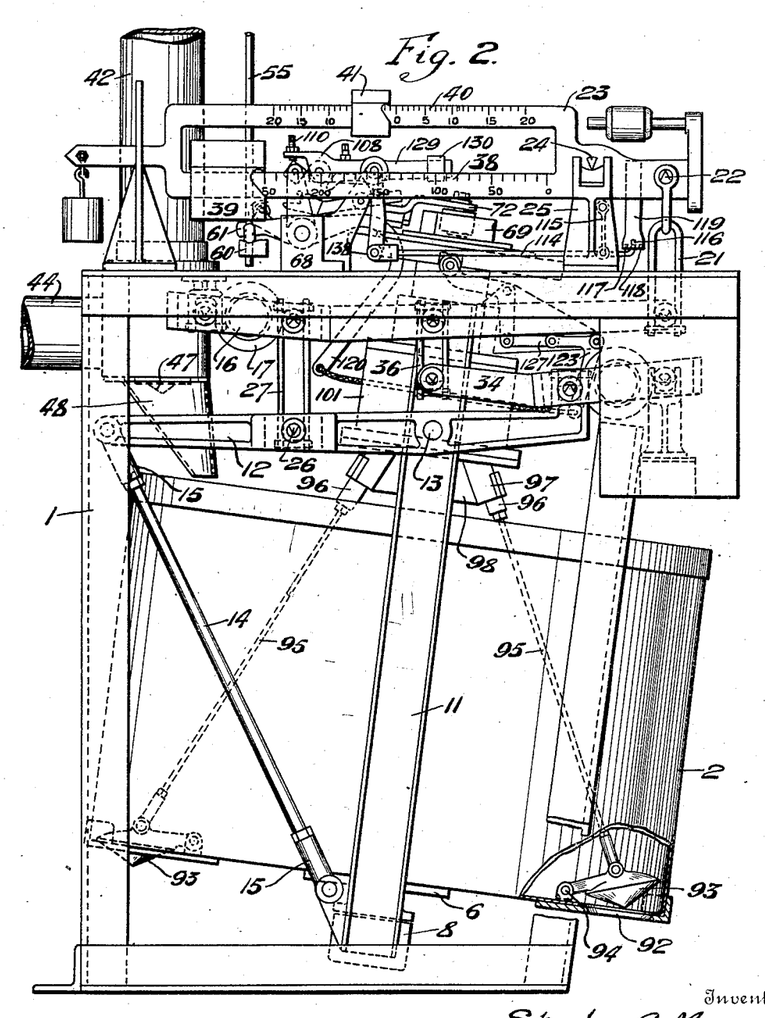
Figure 2 represents a side elevation of the machine shown in Figure 1, the machine being viewed from the opposite side.
Figure 6:
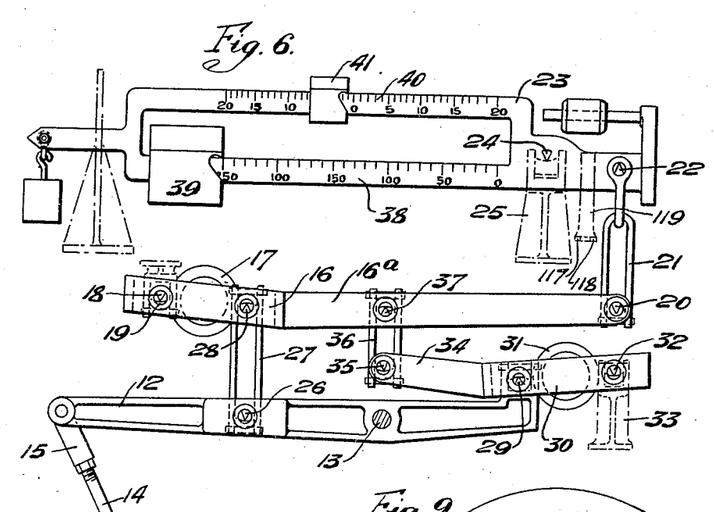
Figure 6 is a detail view of the weighing mechanism and a portion of the cradle which is suspended therefrom and supports the weigh hopper.
Figure 7:
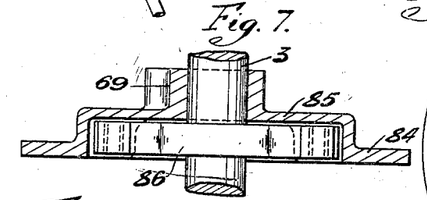
Figure 7 represents a vertical section through the cam which controls and actuates the hopper supply means.
Figure 8:
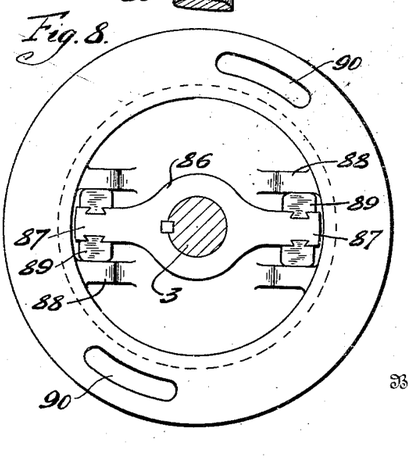
Figure 8 is a bottom plan view of the structure shown in Figure 7.
Figure 9:
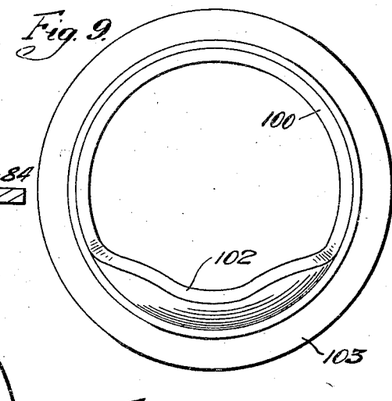
Figure 9 is a top plan view of the cam which controls and actuates the hopper discharge means.
Figure 10:
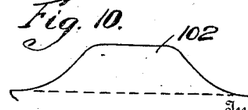
Figure 10 represents a profile of the cam shown in Figure 9.

The members 8 and 10, uprights 11 and members 12 and 14 constitute, in effect, a cradle for the support of the hopper and this cradle and the hopper supported thereby are suspended or otherwise supported by the weighing mechanism of the machine. Preferably and as shown in the present instance, the weighing mechanism comprises a pair of main weigh beams 16 which are located toward the opposite sides of the machine and are rigidly connected to work in unison by a cross member 17. These main weigh beams are suspended toward one end by knife edges 18, which latter rest on bearings 19 fixed to the main frame 1 and an extension 16ª of these main beams carries a knife edge 20 which bears on a link 21, the latter being attached by suitable knife edges 22 to the front end of the steelyard 23, the latter having knife edges 24 which rest on bearings in a bracket 25 which is mounted preferably on the top of the main frame 1. The members 12 forming part of the hopper supporting cradle carry knife edges 26 which rest on bearings in the lower ends of links 27, the latter having bearings in their upper ends which rest on knife edges 28 carried by the main weigh beams 16. The members 12 also carry bearings which rest on knife edges 29, these knife edges being carried by supplemental weigh beams 30, the latter being arranged respectively at opposite sides of the machine and connected rigidly for operation in unison by a cross member 31. The outer ends of the weigh beams 30 carry knife edges 32 which rest in bearings on brackets 33, the latter being mounted at the sides of the main frame and an inward extension 34 fixed to the supplemental weigh beams 30 carries a knife edge 35 which rests on a bearing in the lower end of a link 36, the upper end of this link having a bearing which rests on a knife edge 37 on the main weigh beam extension 16ª. By mounting the weigh hopper and its supporting cradle on weighing mechanism such as that just described, vertical movements of the weigh hopper incident to the operation of the weighing mechanism may take place without varying the angle of inclination of the axis of the hopper with respect to the vertical. Weighing mechanism constructed substantially as described also enables a steelyard to be employed as an element thereof and this is of practical advantage as it not only enables the scale or weighing machine to be set easily and quickly to weigh charges of any desired weight, but it also enables the weighing operations of the machine to be easily, quickly and accurately checked or tested and compensation made for excess weight of material entering the hopper after the feed means has been cut off, it being understood that the column of material in suspension between the weigh hopper and the feed means will fall into the hopper, notwithstanding that the feed means cuts off the supply of material at the moment when the weighing mechanism comes to a poise. The steelyard preferably comprises a main arm 38 on which a slide weight 39 may be set at different points, this arm being graduated according to the different weights of charges that may be weighed within the capacity of the machine, and a secondary arm 40 which carries a slide weight 41, the secondary arm being graduated in opposite directions from its center or intermediate point which represents the zero point for its slide weight when the charge of material in the weigh hopper is of the exact weight for which the main slide weight 39 is set. In compensating for overweight due to the column of material in suspension at the moment the feed means is cut off, the slide weight 41 is shifted toward the left in Figure 6 or toward the free end of the steelyard until the weighing mechanism comes to a poise, and after the reading of the scale at the left-hand side of the zero mark is noted, the slide weight is shifted to the same point on the reversely reading scale at the right-hand side of the zero mark, thus compensating for the material represented by the column in suspension at the moment the feed means is cut off, during the automatic operation of the machine.

Different means may be employed for supplying the material to be weighed to the scale or weighing machine. In the embodiment of the invention shown, means is provided for supplying liquid to be weighed and, furthermore, provision is made for supplying at will, any one of a number of different qualities or kinds of liquid. As shown a number of upright columns or riser pipes 42 are mounted to extend upwardly from casing 43, the latter being bolted or otherwise secured to the main frame 1 and provided with individual supply pipes 44 which lead from tanks, or other sources of supply for the different liquids, it being generally preferable to provide a tank for each liquid supply pipe 44 which is located on the same level with the columns or riser pipes 42, so that the liquid will rise in the columns to the same height as the liquid in the tank. Obviously, instead of providing tanks separate from the respective columns, the tanks may be mounted to take the place of the columns, in which case the tanks would connect directly with the tops of the casings 43. Each casing 43 is provided in its bottom with a discharge opening 45 which is surrounded by a valve seat 46, and the column and valve casing contain a valve 47 which is movable vertically to and from engagement with the valve seat in order to control the discharge of liquid from the opening 45, the discharge openings of the different valve casings being located preferably above a chute or deflector 48 which is above that portion of the weigh hopper which is at the left-hand side of its axis, as shown in Figure 2, whereby liquid discharged from one of the valve casings will be directed into the compartment of the weigh hopper which is located at the higher side of its axis. The valve 47 has a stem or rod 49 fixed to it and this stem or rod extends upwardly through the open top 50 of the column 42. In order to neutralize the effect of hydrostatic pressure of the liquid contained in the column in its action on the valve 47, the valve stem 49 is preferably shrouded by a sleeve 51, the lower end of which has a fluid-tight fit against the upper surface of the valve to avoid the pressure of the liquid on such surface of the valve and the upper end of the sleeve is fixed to the head 52 attached to the upper portion of the valve stem. The upper end of the valve stem is pivotally connected to a lever or rocker 53 which is pivoted or fulcrumed at 54 and is connected at its opposite end to a vertically reciprocatory actuating rod 55, a downward movement of this rod 55 acting to lift or open the valve 47 while the upward movement of this rod lowers or closes the valve 47. One of these actuating rods 55 is provided for each supply valve and each of these rods may be provided with a counter-weight 56 which serves to counter-balance partly the weight of the valve and its sleeve, thus facilitating actuation of the valve.

Figures 11, 14:
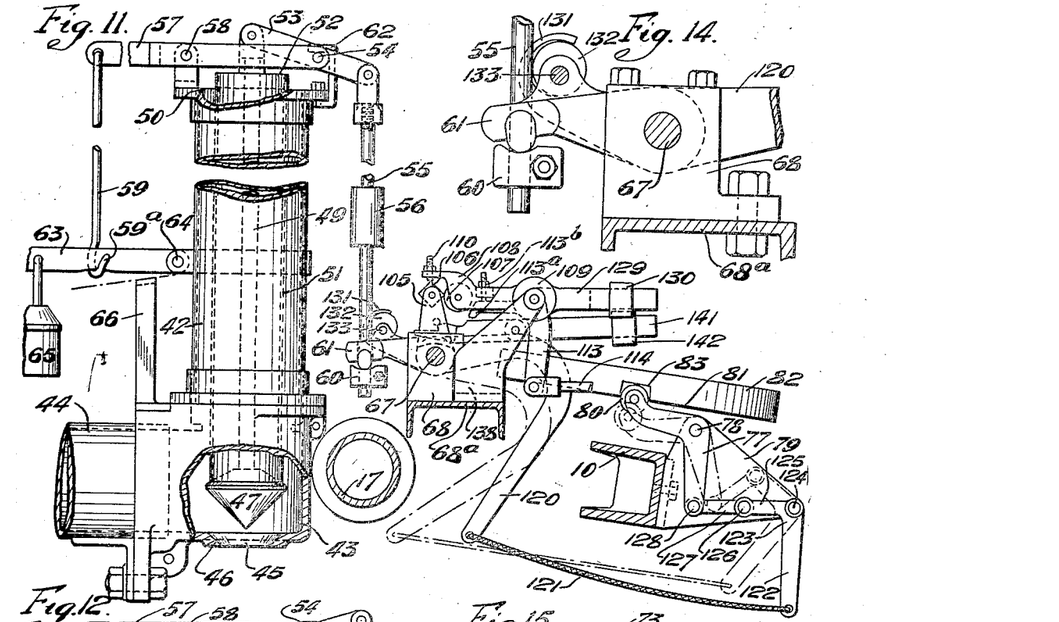
Figure 11 illustrates the hopper feed means, the holding and releasing means which controls rotation of the hopper and the tripping means therefor, the hopper being held in position for filling of its upper compartment and the feeding means being held open for the supply of material to the hopper.
Figure 14 is a detail view of part of the control mechanism, illustrating a device for manually setting the hopper tripping means in operative or inoperative condition.
Figures 12, 13, 15:
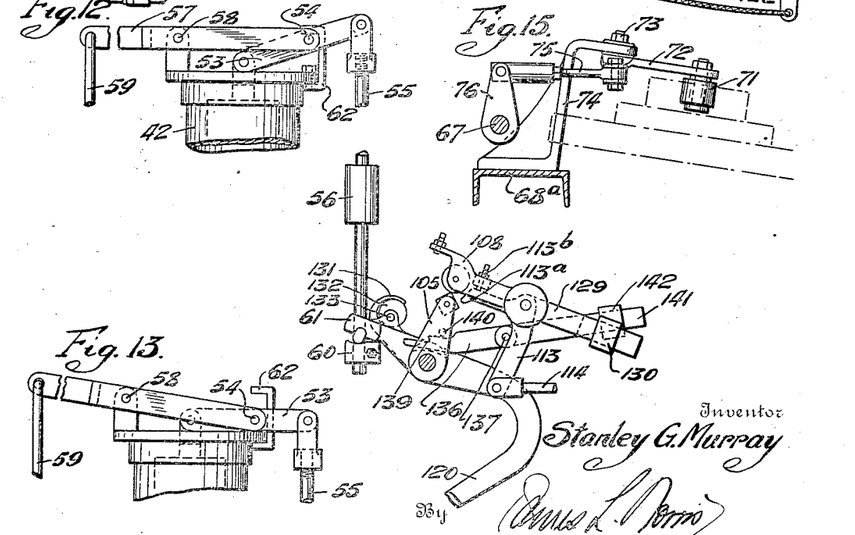
Figure 12 is a view of part of the mechanism shown in Figure 11, showing the tripping means released to cause cutting off of the supply of material to the hopper and releasing of the hopper to permit rotation thereof and thus cause discharge of the weighed material.
Figure 13 is a detail view showing a construction by which any one of a plurality of hopper feeding devices may be set in operative or inoperative condition.
Figure 15 is a detail view, in side elevation, of part of the mechanism for actuating the hopper feeding means.

Means is preferably provided whereby any one of the valves may be set for operation to supply one kind or quality of liquid, while the remaining valves remain inoperative. Such means, as shown in the present instance, comprises a lever 57 for each valve, such lever being pivoted at 58 on the upper end of the respective column, this lever carrying at one end the pivot or fulcrum 54 for the respective lever or rocker 53. The other end of the lever 57 is provided with a rod 59 to which a force is to be applied which will hold the lever 57 in the position shown in Figure 11, in which case the pivot 54 for the rocker 55 will be elevated, thus bringing an abutment 60 on the lower end of the respective actuating rod 55 within the range of operation of an actuating arm 61, so that downward movements of the actuating arm 61 will cause upward opening movements of the valve 47. A bracket 62 may be fixed to the top of the column in a position to be engaged by the pivot 54, whereby the latter will be positioned at its upper limit of motion. Figure 11 shows the parts actuated to open the valve and Figure 12 shows these parts in the relative positions which they occupy when the valve is closed. When the lever 57 is rocked into the position shown in Figure 13, the pivot or fulcrum 54 for the lever or rocker 53 is lowered, in consequence of which the actuating rod 55 will be lowered so that the abutment 60 thereon is lowered beyond the range of movement of the actuating arm 61, and with the parts in this position, downward movement of the actuating arm 61 may take place without opening the feed or supply valve. Different means may be provided for setting the controlling lever 57 to cause or prevent opening of the valve. For example, the lower end of the rod 59 for each valve may be formed with an upturned hook 59ª in which may be engaged a lever 63 which is pivoted at 64 to the respective column and is provided with a weight 65, which acts to swing the lever 63 downwardly and is capable of exerting sufficient downward pull on the rod 59 when the lever 63 is engaged in the hook 59ª, to swing the controlling lever 57 into the position shown in Figures 11 and 12, the valve actuating mechanism being then in operative position; and when the lever 63 is unhooked from the rod 59, it may rest on a suitable support 66, the weight of the rocker 53, rod 55 and counter-weight 56 being then sufficient to swing the lever 57 into the position shown in Figure 13, thus lowering the pivot 54 of the rocker 53 and also lowering the rod 55 and its abutment 60, so that the latter is beyond the range of movement of the actuating arm 61. By hooking the weighted lever 63 on the rod 59 associated with the valve which controls the feed of the desired kind or quality of liquid, such valve will be set in condition for operation while the other feed valves will remain inactive during the operation of the machine. Also, the operation of the weighing machine can be stopped when no further weighing is to be done by disengaging the weighted lever 63 from the hook 59ª and allowing this lever to rest on a support 66, the valve-opening mechanism then assuming an inoperative condition, so that no liquid or material is fed to the weigh hopper until one or another of the valves is set in condition for operation. It will be understood that the liquid level in each column 42 will equalize with that contained in the respective supply tank connected thereto, thus insuring a substantially constant hydrostatic head on the liquid as it discharges through the valve opening, so that the time required for making up a weighed charge in each compartment of the weigh hopper will be substantially constant and the weight of the liquid in suspension at the moment the valve is closed upon the poising of the weighing mechanism, will also be substantially constant, thus insuring uniformity and accuracy in the weighing operations.

Figure 3:
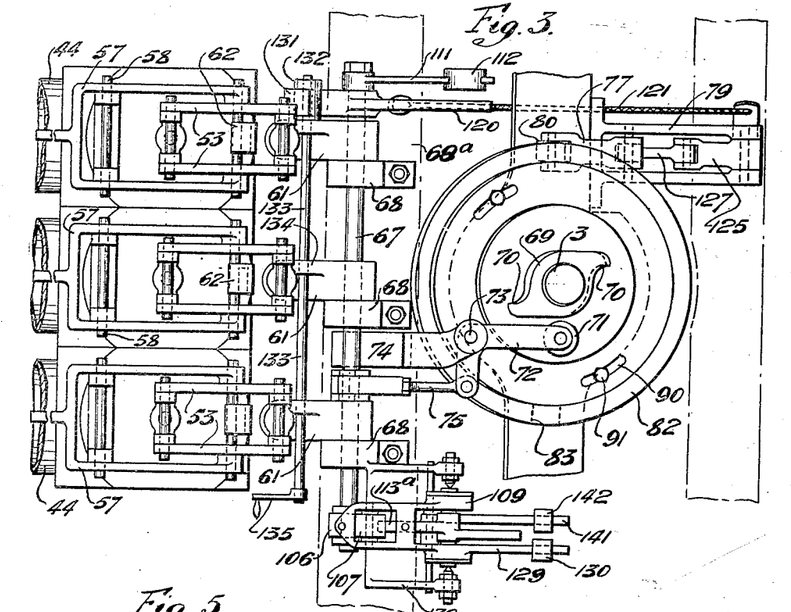
Figure 3 is a top plan view of the machine shown in Figures 1 and 2, the hopper, main frame and other parts being omitted.
Figure 4:
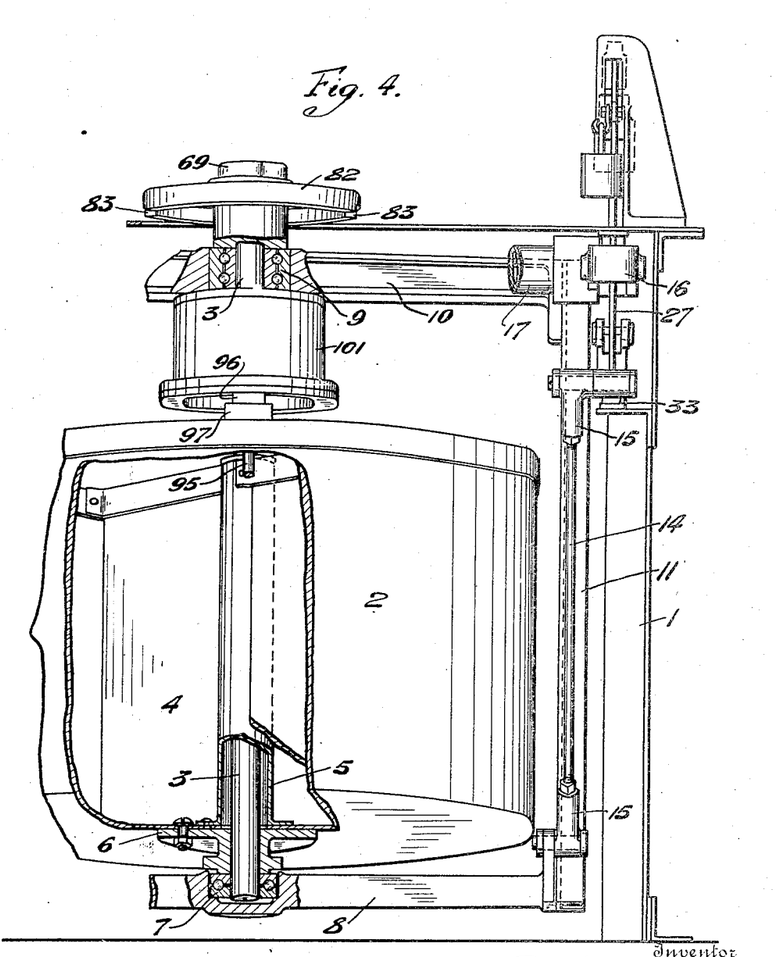
Figure 4 is an elevation, partly in section, of one side of the machine, as viewed from the left in Figure 2.
Figure 5:
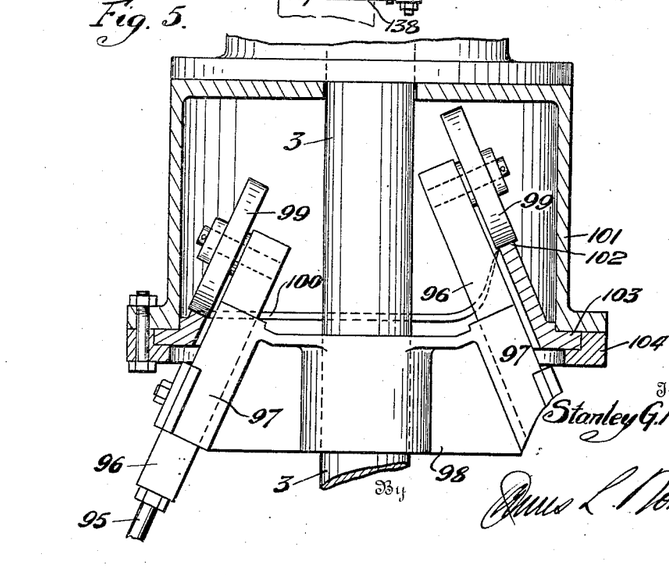
Figure 5 is a detail view, partly in section, showing the hopper discharge actuating means.

Means is provided for automatically opening the feed valve which is in use, in consequence of the rotation of the weigh hopper into a position to discharge the weighed charge of liquid or material from one compartment and to receive another charge of liquid in the other compartment thereof for weighing. Such means comprises preferably the following instrumentalities: A rock shaft 67 is mounted in suitable bearings 68, ball bearings being preferably used, and these bearings are fixed on a stationary cross member 68ª on the top of the main frame. A set of actuating arms 61 is fixed to the shaft 67, these arms being located appropriately so that one will bear upon and depress the abutment 60 on that one of the valve actuating rods 55 which occupies an elevated or operative position, anti-clockwise motion of the rock shaft 67 (Fig. 11) causing opening of the particular valve which is set for operation, and clockwise motion of such rock shaft allowing closing of such valve, as indicated in Figure 12. The rock shaft 67 is preferably actuated positively by the weigh hopper during the final portion of the rotating movement of the latter to bring one compartment thereof into discharging position and the other compartment into filling position. In the present instance, a cam 69, which is mounted on the upper portion of the hopper-supporting shaft 3 and is arranged to turn therewith, has diametrically positioned projections 70 thereon, one or the other of which is arranged to strike on a roller or projection 71 carried by a bell crank lever 72 during the final portion of the rotation of the weigh hopper in a clockwise direction (Fig. 3) to bring the two compartments thereof into dumping and filling positions, respectively. The bell crank lever is pivoted at 73 to a stationary bracket 74 which is fixed to the cross member 68ª on the main frame and the bell crank lever is connected by a rod or link 75 to a crank arm 76 which is fixed to the shaft 67, the arrangement of the parts being such that when the roller 71 is pushed away from the center of the shaft 3 by one of the projections 70 on the cam, the bell crank lever 72 will be rotated about its pivot, in consequence of which the rod 75 will be reciprocated, thus causing the crank arm 76 to rock the shaft 67 in an anti-clockwise direction. (Figs. 11 and 15). Thus the actuating arm 61 on the shaft 67 for the feed valve mechanism which is set for operation will depress the respective abutment 60, and hence open the corresponding valve. The arrangement of the parts is such that while the shaft 67 is rocked into a position to hold the operative valve in open position, the roller 71 will be out of contact with the cam 69, and hence there will be no engagement at this time between these parts to interfere with the accuracy of the weighing operation, it being understood that the cam 69 is carried by the shaft of the weigh hopper which is scale-suspended.

Means is provided for arresting the rotation of the weigh hopper at each half revolution thereof which brings a filled compartment into position for discharge and the other compartment into position for filling, for holding the hopper in such position, and for tripping or releasing the hopper when the filled compartment of the hopper has been emptied and the empty compartment thereof has been filled, whereby the operations of dumping or emptying one compartment and the filling of another compartment may be again performed. Preferably and as shown in the present instance, a bell crank lever 77 is pivoted to a fixed pivot pin 78 which may be carried by a bracket 79 fixed to the upper support 10 which constitutes a member of the scale-suspended cradle for the weigh hopper. One arm of this bell crank lever carries a roller or projection 80 which is adapted to travel on the lower surface 81 of a disk 82, while the hopper is rotating a half revolution to bring a filled compartment into dumping position and an empty compartment into filling position, and this roller or projection 80 is adapted to enter a notch or recess 83 in the disk 82 at the moment the hopper is rotated sufficiently to bring it into one of its two positions, there being two of these notches or recesses 83 which are located in diametrically opposite positions on the disk 82. The disk 82 is connected to the hopper shaft 3 so that it rotates therewith. In order to absorb the impact due to the engagement of the roller or projection 80 in the notch or recess 83, and thus avoid shock due to the consequent arresting of the rotation of the weigh hopper, the disk 82 is preferably connected to the shaft 3 indirectly by bolting or otherwise securing it to a peripheral flange 84 forming part of a housing 85, which latter carries the valve opening cam 69, this housing being mounted loosely or rotatably on the shaft 3 but connected to rotate in unison therewith by a spider or cross arm 86 which is keyed or fixed to the shaft and has arms 87 which extend into spaces between lugs 88 which are fixed within or form parts of the housing 85, yielding cushions 89 which may be composed of blocks of rubber being interposed between the arms 87 and the lugs 88, so that they will transmit motion from the spider 86 to the housing 85, but will yield and thereby absorb shock due to sudden stoppage of the disk 82, incident to the locking of the roller or projection 80 in the notch 83 thereof. Also, it is preferable to adjustably connect the controlling disk 82 to the housing 85, in order that the weigh hopper may be held in the most advantageous position to insure prompt starting of the rotation of the hopper to bring the filled compartment into weighing position and to gradually retard or gently arrest the rotation of the hopper as the filled compartment thereof approaches its emptying position. As shown in the present instance, the flange 84 of the housing 85 is provided with circumferentially elongated slots 90 through which clamping screws 91, tapped in the disk 82, may extend, this arrangement permitting the disk 82 to be clamped or locked in different angular positions relatively to the housing 85 and about the shaft 3 as a center. In this way, the locking notch or recess 83 of the disk 82 can be set in different positions relatively to the diametrical dividing partition of the weigh hopper, so that the roller or projection 80 will arrest the weigh hopper in such position that the diametrical dividing partition thereof extends in the desired direction. For example, in the weighing of light materials or small quantities of material, it is desirable to so set the disk 82 that the upper edge of the diametrical partition will extend at a substantial inclination to the horizontal, in order that the relatively small weight of the material in the filled compartment at the upper side of the hopper shaft will furnish sufficient power to promptly rotate the hopper into its reverse position, whereas, in handling the heavier materials or large quantities of material, the inclination of the upper edge of the diametrical partition of the weigh hopper may extend at a less angle to the horizontal, owing to the greater power available to rotate the hopper. In any case, however, the upper edge of the diametrical partition of the weigh hopper is inclined to the horizontal in order to avoid equilibrium which would exist if the upper edge of the partition were horizontal and to obtain an action during the rotation of the hopper which is similar to that of a pendulum, the weight of the material in the filled compartment acting while this compartment is at the upper side of the inclined axis of the hopper, to swing the hopper to bring this compartment to the lower side of such axis, and during the final portion of the rotary movement of the hopper during which the upper edge of the partition passes its horizontal position and assumes a position inclined to the horizontal, the consequent lifting of the load of material in the filled compartment acts to retard or gradually arrest the rotation of the hopper, thus permitting rapid operation of the machine and substantially relieve the hopper-arresting means of shock. Ordinarily, the disk 82 may be so set that the upper edge of the diametrical dividing partition of the hopper is at an angle of about 40 degrees to the horizontal, when the hopper is held in position for the filling of one compartment and the emptying of the other compartment thereof.

The emptying of the compartments of the weigh hopper is controlled preferably by valves which are fitted in the bottoms of the respective compartments, and the operation of these valves is preferably effected positively and in consequence of the rotary movements of the hopper. Preferably and as shown in the present instance, each compartment of the weigh hopper has a discharge opening 92 surrounded by a seat, and a valve 93 is provided which may be hinged to the bottom of the tank, as at 94, and is provided with an actuating stem or rod 95 which is pivotally or otherwise operatively connected thereto and has a slide 96 which is mounted to reciprocate in a guide 97, the guides for the two valves being preferably formed as parts of a bracket 98 which is fixed to the hopper supporting shaft 3 at a point above the hopper. Each valve actuating slide 96 carries a roller 99 which is adapted to ride on the surface of the cam 100, this cam being suitably fixed within a housing 101 carried by the member 10 of the hopper-supporting cradle. The cam 100 has a raised portion 102 thereon which is so located that when the roller 99 for the discharge valve of the compartment which is swinging into emptying position reaches and rides up thereon, the respective valve-actuating rod 95 will be drawn upwardly, thereby unseating the respective discharge valve 93 and causing the material in the respective compartment of the hopper to be discharged therefrom. By locating the discharge valve adjacent to the outer peripheries of the hopper, thorough emptying of the liquid or material from the compartment is insured, as the bottom of the compartment will slope from all directions toward the discharge opening. The cam 100 is preferably formed as a ring having a peripheral flange 103 which is adapted to be bolted, or clamped, between the body portion of the housing 101 and a ring 104, this arrangement enabling the cam to be properly set or adjusted to insure opening of each discharge valve when the hopper reaches the desired position in its rotation.

Novel means is provided for automatically tripping and closing the feed valve to interrupt the feeding of material to the hopper at the moment a predetermined weight of material has been fed thereto, for tripping the hopper controlling means to permit rotation of the hopper to bring the filled compartment thereof into emptying or discharging position, and for holding the feed valve in open position, after its re-opening, for the making up of the next weighed charge. Preferably and as shown in the present instance, such means comprises the following instrumentalities: A governing arm 105 is fixed to the rock shaft 67 so that it swings in unison with said shaft. This governing arm carries a member 106 which is preferably in the form of a sharp edge block or knife edge which is presented to the periphery of a roller 107, which is journaled in a trigger 108, the latter being freely mounted to rock on bearings 109 which are preferably of the anti-friction type. The trigger is normally positioned relatively to the governing arm 105 by a stop preferably in the form of a set screw 110 which bears on the upper corner of the block 106, this stop or set screw being so arranged or adjusted that when the trigger is in its normal position the edge of the block 106 which bears on the roller 107, touches this roller at a point slightly above the center of the roller. Means is provided which acts to rotate the shaft 67, and hence to swing the governing arm 105 in a clockwise direction, (Fig. 11) such means comprising, for example, an arm 111 provided with a weight 112, but the off-center relation between the roller 107 and the edge of the block 106 which engages this roller, tends to hold the trigger in a position to lock the governing arm 105 from movement in a clockwise direction, (Fig. 11) and when the governing arm 105 is so held by the trigger, the feed valve in use will be held by its arm 61 in open position. A trigger-releasing member 113 is provided which is mounted concentrically with the pivotal axis of the trigger and embodies an arm 113ª which is arranged in the path of the set screw or abutment 113ᵇ on the trigger. This trigger-releasing arm is operatively connected to the weighing mechanism, whereby, when a load of the weight for which the machine is set has been made up in the weigh hopper, the trigger will be actuated to trip and release the governing arm 105, thereby allowing the shaft 67 to rotate in a clockwise direction and thus cause closing of the feed valve, as shown in Figure 12. In the preferred construction, the arm 113 is connected to a rod 114 which is suspended so that it may reciprocate substantially without resistance, by a link 115 which may be suspended by knife edges from a bracket 25, this rod having a portion 116 which is located between a pair of spaced projections 117 and 118 on the arm 119, the latter being fixed to a part of the weighing mechanism, as, for example, the short end of the steelyard 23, so that this arm will operate in unison with the movements of the weighing mechanism. By this arrangement, when the weighing mechanism comes to a poise, incident to the making up of a load or charge of material in the weigh hopper, the short end of the steelyard, or the right-hand end thereof in Figure 2, swings downwardly, carrying with it the arm 119 and causing the projection 118 on this arm to swing toward the left in said figure, the rod 114, in consequence, being shifted toward the left in Figure 2, thereby rotating the arm 113 in a direction to elevate the trigger 108 sufficiently to carry the edge of the block 106 in engagement with the periphery of the roller 107 below the center of this roller. Thereupon the governing arm 105 acting under the influence of the weight 112 on the shaft 67 will swing quickly to the right into the position shown in Figure 12, it deflecting the trigger upwardly in so doing and allowing the valve actuating rods 70 61 on the shaft 67 to rise, thus causing the feed valve, which was open, to close and immediately cut off the further supply of material to the weigh hopper.

Means is provided for releasing the weigh hopper to permit it to rotate to bring the filled compartment thereof into dumping position simultaneously with the tripping and closing of the feed valve. Such means, as shown in the present instance, comprises a trip arm 120 which is adapted to participate in the movement of the shaft 67 when the latter operates to close the feed valve incident to the release of the trigger. This trip arm is connected by a chain, cable or the like 121 to an arm 122 of a bell crank 123, the latter being pivoted at 124 on the bracket 79 and having an arm 125 which constitutes one member of a toggle, this arm 125 being pivotally connected at 126 to a link 127, the latter being pivotally connected at 128 to the lower arm of the bell crank lever 77. When the roller 80 of the hopper-control means rests in the notch or recess 83 of the disk 82, the toggle comprising the arm 125 and link 127 will be straightened, and hence the toggle will lock the roller 80 in the notch, as shown by the full lines in Figure 11. However, when the shaft 67 rotates in a clockwise direction, incident to its release by the trigger, the trip arm 120 will rotate in the same direction and toward or into the dotted line position (Fig. 11), tension being thereby applied to the member 120 which rotates the bell crank lever 123 in a direction to break the toggle and thereby swing the bell crank lever 77 into a position to retract the roller 80 from the notch or recess 83, as indicated by the dotted lines in Figure 11. The weigh hopper is then released and it will rotate under the influence of the weight of the material in the filled compartment at the upper side of its inclined axis, to bring the filled compartment into emptying or discharging position. While the hopper is thus rotating the roller 80 will ride on the underside 81 of the disk 82, and when the hopper rotates a half revolution or sufficient to bring the filled hopper into emptying position, the roller 80 will engage the notch or recess 83 which is diametrically opposite to the notch previously engaged by the roller, the toggle comprising the arm 125 and link 127 then straightening and thereby locking the roller 80 in such notch. Immediately before the hopper reaches the end of its half revolution, the cam 69 acts on the roller 71 to rotate the shaft 67 in an anti-clockwise direction (Fig. 11), this operation forcing the valve actuating arms 61 downwardly so that the valve in use will be re-opened and the trip arm 120 will be restored to its full line position (Fig. 11), this taking place before the notch 83 reaches the roller 80, so that the toggle is free to act to force the roller 80 into the notch and to lock it in such position when the notch reaches the roller. When the weighing mechanism returns to the position which it occupies prior to the making up of a load in the weigh hopper, the projection 117 on the arm 119 will act on the part 116 of the link 114 and will draw the latter toward the right in Figure 2, such movement of the member 114 being permitted by the member 113, as the part 113$^a$ of the latter only bears against the stop of set screw 113$^b$ of the trigger, so that the member 113 is capable of swinging toward the right in Figure 11, independently of the trigger. The trigger 108 is preferably provided with a tail or extension 129 which carries a counter weight 130 by which the trigger can be delicately poised.

Means is preferably provided by which the release of the weigh hopper following the making up of a weighed charge therein can be controlled manually, if so desired. As shown in the present instance, the releasing arm 120 is mounted loosely or rotatably on the rock shaft 67 and it has a hook-shaped end 131 which is acted on by a cam or eccentric 132. This cam or eccentric is fixed to a shaft 133, which is journaled in lugs 134 on the valve-actuating arms 61, and the shaft 133 is provided with a handle 135 by means of which it may be rotated. When the shaft 133 is rotated to bring the cam or eccentric 132 into the position shown in Figure 11, the releasing arm 120 will be so set relatively to the shaft 67 that the range of movement of the lower end of the arm 120 will be sufficient to tension the member 121 and release the disk 82, but when it is desired to prevent rotation of the hopper after a weighed charge has been made up therein, the shaft 133 is rotated to reverse the position of the cam 132; that is, to bring it into the position shown in Figure 14, and when the cam is in that position, the releasing arm 120 will occupy such a position relatively to the shaft 67 that the rocking of this shaft following its release by the trigger 108 will cause the arm 120 to operate in an altered position, so that its lower end does not shift sufficiently far toward the left (Fig. 11) to pull upon the member 121, and hence the roller 80 will remain locked in its notch in the disk 82. This manual control for the release of the weigh hopper is of particular advantage when it is desired to test the weighings made by the machine or to adjust the weighing mechanism to compensate for the amount of material in suspension at the moment the feed valve is closed.

As the opening of the feed valve to supply material to the empty compartment of the weigh hopper takes place as soon as the weigh hopper is rotated to bring the empty compartment into filling position, the liquid or material flowing into the empty compartment offsets to some extent the reductions in the total weight of material in the weigh hopper, in consequence of the emptying of the liquid or material from the filled compartment, and hence the return of the weighing mechanism, due to emptying of the weighed charge from the weigh hopper is somewhat retarded. Also, while the weigh hopper is in its lower position, due to the total weight of the load therein, the trigger 108 will be held in its tripped or elevated position by the part 113$^a$, substantially as is shown in Figure 12. In consequence, when the shaft 67 is rotated in a direction to re-open the feed valve, due to the movement of one of the projections 70 of the cam 69 past the roller 71, the shaft 67 will immediately return to a position to close the feed valve, if the trigger 108 alone were depended upon, as the trigger at that moment is still in its tripped or elevated position. Means is, therefore, provided for temporarily holding the shaft 67 in its feed valve opening position, until the weigh hopper rises, in consequence of the reduction in the total weight of material therein, whereupon the governing arm 105 is re-engaged with the trigger and the temporary-holding means for the shaft 67 is rendered inactive. The temporary holding means consists in the present instance of a latch 136 which may be pivoted at 137 to a bracket 138 which supports the trigger, one end of the latch having a shoulder 139 which is arranged to cooperate with a pin or projection 140 on the governing arm 105, the opposite end of this latch having an extension 141 which carries a weight 142 which acts normally to yieldingly press the shouldered end of the latch against the pin 40. The shouldered end of the latch 136 lies beneath and in the path of the free end of the part 113$^a$ of the trigger-releasing member 113. In using such a latch, when the governing arm 105 is swung toward the left (Figs. 11 and 12) under the action of the cam 69, thereby rotating the shaft 67 in a direction to open the feed or supply valve, the shouldered end of the latch 136 will swing upwardly and the shoulder thereon will be in the path of the pin 140 on the arm 105, in consequence of which the swing of the controlling arm 105 toward the left and which would cause re-closing of the feed valve, if such movement were permitted, is prevented, the controlling arm 105 being thus held in such a position that the operative edge of the block 106 is slightly removed from the path of the roller 107 of the trigger. Subsequently, when the trigger is allowed to descend or return to its normal position, incident to the rising of the weigh hopper, the roller 107 of the trigger will move into a position in front of the block 106, this being permitted by the swing of the trigger-releasing member 113 to the right (Fig. 12), and as the member 113 continues to swing in that direction, the free end of the part 113$^a$ will come into engagement with the upper side of the latch 136 and will depress the latch sufficiently to disengage its shoulder from the pin 140, the governing arm 105 being then permitted to move a slight distance further toward the right, and causing the operative edge of the block 106 thereon to settle against the periphery of the roller 107. While the governing arm 105 is thus held by the trigger, the latch will rest against the underside of the pin 140, but the latter will not be obstructed by the latch, so that the governing arm 105 may swing into the position shown in Figure 12 when the trigger is tripped by the weighing mechanism coincident with the poising of the weighing mechanism.

The mode of operation of a scale or weighing machine constructed as hereinbefore described, is as follows: Assuming the weigh hopper to be held by the bell crank lever 77 so that the compartment thereof at the upper side of its inclined axis is in position for filling and that the feed valve has been opened by the cam 69 and is held open by the trigger 108, the liquid or other material flows into the upper compartment through the feed opening 45 and during the filling of the empty compartment, the previously filled compartment is being emptied by the opening of its valve 93, the roller 99 for actuating such valve having traveled up on to the high part 102 of the cam 100. As soon as the predetermined weight of material has been fed into the upper compartment of the weigh hopper, the weighing mechanism comes to a poise, as the result of which the member 113 trips the trigger 108, and the shaft 67 being thus released immediately causes closing of the feed valve. By the same operation of the shaft 67, the trip arm 122 operates to flex or break the toggle 125, thereby withdrawing the roller 80 from the notch 83 in the hopper-control disk 82, the hopper being unlocked and the weight of material in the compartment at the upper side of the inclined axis of the weigh hopper tends and does rotate the latter, owing to the unbalanced condition of the weigh hopper, thus bringing the filled hopper into a diametrically opposite position at the lower side of the axis of the hopper, and when this position has been reached the roller 80 engages the appropriate notch 83 in the disk 82 and thereby arrests the movement of the hopper and holds it in position for discharge of the material from the filled compartment. As the weigh hopper approaches such position, the projection 70 of the cam 69 passes and deflects the roller 71, in consequence of which the shaft 67 is actuated in a direction to re-open the feed valve to feed material to the empty compartment which has just been brought into position and as the shaft 67 is rotated into valve-opening position, the latch 136 cooperates with the pin 140 to temporarily hold the shaft 67 and its governing arm 105 in valve-opening position. When sufficient material has been discharged from the lower or previously filled compartment, the hopper rises, in consequence of which the member 113 reverses its direction of movement, first allowing the trigger 108 to descend so that it resumes a position opposite to the operative edge of the block 106, and as the retarding movement of the member 113 continues, the free end of the part 113$^a$ thereof engages and depresses the latch 136, thereby disengaging it from the pin 140, thus allowing the block 106 on the governing arm 105 to settle against the periphery of the roller 107 on the trigger, the feed valve being thus held open until the trigger is again tripped by the poising of the weighing mechanism.

The cycle of operation described will be repeated automatically until the weighted lever 63 is unhooked from the rod 59 of the feed valve which is in use, thereby cutting off the further supply of material to the weigh hopper, or the handle 135 is manipulated to reverse the cam 132 whereby releasing of the weigh hopper following the making up of a weighed charge therein is prevented.

By wholly suspending or supporting the weigh hopper and the means which controls its rotation from the weighing mechanism, uniform accuracy in the weighing operations is insured, as the poising of the weighing mechanism takes place solely under the influence of the weight of material which is undergoing weighing, unimpeded and uninfluenced by forces or conditions which would introduce inaccuracies and variations in the weighing operations. Also, by supporting the weigh hopper in a cradle which includes the means for varying the angle of inclination of the axis of revolution of the weigh hopper, correct functioning of the weighing mechanism in performing the weighing operations is accomplished without introducing any inaccuracies or variations into the weighing operations.

The provision for adjustment of the angle of inclination of the axis of revolution of the weigh hopper enables the machine to be accommodated to the weighing of materials of different weights or to the weighing of different quantities of material in order to secure the desired speed of rotation of the hopper or to suit other requirements, it being obvious that when relatively heavy or large quantities of materials are being weighed, the heavier weight of the load in the filled compartment of the hopper at the upper side of its inclined axis acts with greater force to rotate the hopper than is the case when relatively lighter or smaller quantities of material are being weighed.

By arranging the hopper relatively to its controlling catch so that, when the hopper is held in position for filling one compartment and emptying the other compartment, the upper edge of the diametrical or transverse partition is inclined to the horizontal, the load of material introduced into the upper compartment will create an unstable equilibrium in the hopper which will cause prompt starting of the rotation of the hopper, when released, and will also produce a retarding effect upon the rotation of the hopper as the filled compartment approaches its emptying position, this retarding effect relieving the controlling catch of much of the shock incident to the stopping of the hopper, the rotation of the hopper being comparable with the swing of a pendulum. The adjustment provided whereby the angle of the dividing partition of the hopper relatively to the horizontal may be varied enables the hopper to be adjusted so that it will promptly initiate the rotation, when released, and come to rest gently, to suit the weighing of materials of different weights or different quantities of material.

In the particular embodiment of the invention herein shown and described, the feed and discharge valves are positively operated in consequence of the rotation of the hopper, so that certainty in their operation at the proper times is insured and, moreover, it is impossible for any of the material to pass unweighed through the machine.

The plural or multiple feed means provided enables the machine to be easily and quickly set to weigh different qualities or kinds of materials, although the feed valve for any of these materials is controlled and actuated by mechanism which is common to all these valves; and the manual control means provided enables any one of the valves to be readily brought into operation to supply the desired material or to be rendered inoperative to discontinue the feed of material and thus stop the operation of the machine.

The trigger mechanism for releasing the feed valve mechanism to cause closing of the feed valve and releasing of the hopper so that it may bring the filled compartment into emptying position, is capable of acting with precision, it requiring a very slight impulse from the weighing mechanism, and it also embodies means for automatically preventing tripping of the feed valve mechanism during the period preceding the rising of the weigh hopper pending the discharge of a sufficient quantity of material from the compartment which is in emptying position, thus insuring continuous automatic operation of the machine.

The manual control means for governing the tripping of the holding catch for the weigh hopper enables the machine to be readily set to weigh a charge of material without dumping it, whereupon the exact weight of such material may be determined by manipulation of the slide weight or weights of the steelyard. The overdraft of material received by the charge, consisting of the column of material in suspension at the moment the feed valve is closed incident to the poising of the weighing mechanism, may thus be determined, and the supplementary slide weight of the steelyard may be set to accurately compensate for such overdraft, thus insuring uniform accuracy in the weights of the charges of material.

I claim as my invention:—

1. A weighing machine comprising weighing mechanism, a weigh hopper having means whereby it is supported wholly by the weighing mechanism to rotate on an axis which is inclined to the vertical and its axis is held at a variable angle of inclination.

2. A weighing machine comprising weighing mechanism, a weigh hopper, and means rotatably supporting said hopper wholly by the weighing mechanism on an axis which is inclined to the vertical.

3. A weighing machine comprising weighing mechanism, a weigh hopper, means whereby the weigh hopper is rotatably supported by the weighing mechanism, and means also supported by the weighing mechanism for holding the axis of the weigh hopper at one or another of different angles of inclination to the vertical.

4. A weighing machine comprising weighing mechanism, a cradle supported by said mechanism, and a weigh hopper, means whereby the weigh hopper is rotatably supported by the cradle, the cradle embodying means for adjusting and holding the axis of the hopper at different angles of inclinations to the vertical.

5. A weighing machine comprising weighing mechanism, a cradle embodying a member mounted for movement in unison with the movements of the weighing mechanism, and a member pivoted to swing relatively to the first-mentioned member, a weigh hopper, means whereby the weigh hopper is rotatably mounted on said pivoted member, and an element connecting said members of the cradle and adjustable to set and hold the axis of the hopper at different angles to the vertical.

6. A weighing machine comprising weighing mechanism of the platform type, a cradle embodying a part supported to move bodily in unison with the weighing mechanism, a part pivotally supported by the part first-mentioned, and a member adjustably connecting said parts of the cradle to vary their angular relation, and a weigh hopper rotatably supported on an axis inclined more or less to the vertical by the pivotally supported part of the cradle.

7. A weighing machine comprising weighing mechanism, a weigh hopper having a partition which divides it into opposed compartments, means whereby the weigh hopper is supported by the weighing mechanism to rotate on an axis which is inclined to the vertical, and releasable means carried by the weighing mechanism for holding the hopper in such position in its rotation that the weight of material introduced into a compartment at the upper side of its axis will produce an unbalanced condition tending to rotate the hopper.

8. A weighing machine comprising a rotatable weigh hopper having a partition which divides it into oppositely-positioned compartments, and releasable means for arresting and holding the hopper in its rotation, said means being adjustable to vary the position occupied by the partition of the hopper when held by said means.

9. A weighing machine comprising a weigh hopper rotatable about an axis which is inclined to the vertical and having a partition which divides it into compartments, and means for arresting the rotation of the hopper, said means being adjustable to cause the partition of the hopper to be located in different positions when the rotation of the hopper is arrested.

10. A weighing machine comprising a rotatable hopper, a controlling member rotatable with the hopper, and a catch for releasably engaging said member at predetermined points in its rotation to arrest the rotation of the hopper, said member being angularly adjustable relatively to the hopper and around its axis to vary the position at which the rotation of the hopper is arrested.

11. In a weighing machine having a rotatable weigh hopper, a controlling member rotatable with the hopper, and means cooperative with said member to arrest the rotation of the hopper embodying a latch to cooperate with said member, and a toggle operative to engage and lock the latch with said member and to disengage the latch therefrom.

12. In a weighing machine, a rotatable hopper having a controlling member connected to rotate with it, a latch, an actuating member therefor having an arm, and a link connecting said latch to said arm and forming with the latter a toggle which when straightened locks the latch with said controlling member and when flexed retracts the latch to release the controlling member.

13. In a weighing machine, a rotatable hopper having a disk connected to rotate with it, said disk having a locking notch in the face, a latch having a roller adapted to ride on the face of the disk and to engage in the notch thereof, and a toggle operative, when flexed, to withdraw the roller from the notch and adapted to straighten when the roller engages in the notch to lock the roller therein.

14. A weighing machine comprising a rotatable weigh hopper, feeding means for supplying material thereto, means embodying a cam rotatable with the hopper for setting the feeding means to supply material to the hopper when the latter reaches a predetermined position, and means controlled by the poising of the weigh hopper to hold the feeding means in feeding condition.

15. A weighing machine comprising a rotatable weigh hopper having a partition which divides it into compartments, feeding means for supplying material to the hopper, means for holding the hopper successively in positions to bring the compartments therein into position to receive such material, means including a cam rotatable with the hopper and operative to set the feeding means into operation, and means for holding the feeding means in feeding condition and for rendering the cam inoperative during such period.

16. A weighing machine comprising a scale-suspended rotatable weigh hopper, means controlling its rotation, feeding means for supplying material thereto, means operative in consequence of rotation of the hopper for setting the feeding means in feeding condition, means operative in consequence of rotation of the hopper for discharging weighed material from the hopper, and governing means for the feeding means and the hopper control means releasable by the poising of the weigh beam.

17. A weighing machine comprising a scale-supported rotatable weigh hopper, feeding means set automatically into operation in consequence of rotation of the hopper to supply material thereto, scale-supported means controlling the rotation of the hopper, and governing means operative to hold the feed means in condition to feed material to the weigh hopper until a charge of predetermined weight is made up therein and thereupon operative to cut off the feed and to release the hopper control means.

18. A weighing machine comprising a rotatable scale-supported weigh hopper having compartments therein, scale-supported means for holding the hopper in predetermined position for the filling of a compartment thereof, feeding means set into operation automatically in consequence of rotation of the hopper to feed material thereto, and means operative to hold the feeding means in feeding condition and operative automatically by the poising of the weigh hopper to trip and cause closing of the feed means and to release the hopper-holding means.

19. A weighing machine comprising a rotatable scale-supported weigh hopper having compartments therein, means operative in consequence of rotation of the hopper to feed material to a compartment thereof, discharge means for the compartments each having means for opening it in consequence of rotation of the hopper to carry its respective compartment from feeding to discharging position, and scale-supported means governed by the poising of the weigh hopper for controlling its rotation.

20. A weighing machine comprising a rotatable scale-supported weigh hopper, scale-supported means for controlling its rotation, feeding means for supplying material to the hopper, means including a cam carried by the hopper for setting the feeding means in feeding condition, means operative automatically to hold the feeding means in feeding condition and for tripping the feeding means and hopper controlling means in consequence of poising of the weigh hopper, discharge means for the hopper, and means including a cam operative when the hopper reaches a predetermined position in its rotation, to open the discharge means.

21. In a weighing machine, the combination of a weigh hopper and cooperating weighing mechanism, hopper feed means, a governing arm therefor, means for releasably retaining the governing arm in a position to hold the feeding means in feeding condition comprising a trigger movable into and out of a position to obstruct the movement of said arm, and trigger-tripping and resetting means having a lost-motion connection with and actuated by the operation of the weighing mechanism.

22. In a weighing machine, the combination of weighing means supporting a weigh hopper, feeding means for the weigh hopper including a governing arm, a trigger movable into a position to obstruct the movement of said governing arm and thereby hold the feeding means in feeding condition, and means having a lost-motion connection with and operative by the weighing means to displace the trigger and thus permit movement of said arm and to restore the trigger to a position to obstruct the movement of said arm.

23. In a weighing machine, the combination of weighing means supporting a weigh hopper, feeding means for supplying material to the weigh hopper, means for setting the feeding means in feeding condition including a governing arm, a trigger movable into a position to hold said governing arm when the feeding means is set in feeding condition, and means having a lost-motion connection with and operative by the weighing means when the weigh hopper is poised for displacing the trigger relatively to said governing arm and for restoring the trigger to hold said arm when the weigh hopper rises.

24. In a weighing machine, the combination of weighing means, a weigh hopper supported thereby, feeding means for supplying material to the weigh hopper, actuating means for the feeding means including a governing arm, a trigger movable into a position to hold the controlling arm when said actuating means operates to set the feeding means in feeding condition, trigger-tripping means operative by the weighing means when the weigh hopper settles, and means operative to temporarily engage the governing arm, prior to its engagement by the trigger, and thus hold the feeding means in feeding condition.

25. In a weighing machine, means for controlling the operation of hopper feeding means therefor comprising a governing arm for holding the feeding means in feeding condition, a trigger arranged to engage said arm, means for tripping the trigger to release said arm, and a latch operative to engage and hold said arm prior to its re-engagement by the trigger.

26. In a weighing machine, the combination of hopper feeding means including a governing arm for holding the same in feeding condition, a trigger operative to engage and hold said arm in a position to maintain the feeding means in feeding condition, a latch operative to hold said arm in said position prior to its engagement by the trigger, and a member movable in one direction to disengage the trigger from said arm and movable in another direction to disengage the latch from said arm.

27. In a weighing machine including weighing mechanism supporting a weigh hopper, feeding means for the weigh hopper including a governing arm for holding the same in feeding condition, a trigger movable into a position to hold said arm when the feeding means is set in feeding condition, a latch normally tending to engage and hold said arm prior to the engagement therewith of the trigger, and a member operatively connected to the weighing mechanism and movable, when the weigh hopper descends, in a direction to trip the trigger, and movable, when the weigh hopper rises, to trip the latch and permit engagement of the trigger with said arm.

28. In a weighing machine, the combination of a rotatable weigh hopper, means for holding the hopper from rotation, and tripping means for said holding means embodying a trigger-controlled member, a trip arm connected to said holding means and movable in unison with said member, and means for altering the relation between said member and trip arm to render the latter operative or inoperative with respect to said holding means.

29. In a weighing machine, the combination of a rotatable weigh hopper, means for holding the hopper from rotation, a rock shaft having means for controlling its movement, a trip arm loosely mounted on said shaft and operatively connected to the hopper holding means, and manually-adjustable means for altering the angular relation between the trip arm and said shaft to render the trip arm operative or inoperative relatively to said holding means.

30. In a weighing machine, the combination of a rotatable weigh hopper, and means for arresting its rotation comprising a catch, a notched member cooperative with the catch and rotatable with the hopper, and shock-absorbing means interposed between said member and the hopper.

31. In a weighing machine, the combination of a rotatable weigh hopper having a supporting shaft, an armed member fixed to said shaft, a notched disk loosely mounted on said shaft, shock-absorbing means interposed between the arms of said member and the disk, and a catch to cooperate with the notched disk.

In testimony whereof I have hereunto set my hand.

STANLEY G. MURRAY.